US008798213B2

(12) United States Patent
Lindoff et al.

(10) Patent No.: US 8,798,213 B2
(45) Date of Patent: Aug. 5, 2014

(54) COMMUNICATION DEVICE AND METHOD

(75) Inventors: Bengt Lindoff, Bjärred (SE); Bo Bernhardsson, Lund (SE); Johan Nilsson, Höllviken (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 926 days.

(21) Appl. No.: 12/682,857

(22) PCT Filed: Aug. 27, 2008

(86) PCT No.: PCT/EP2008/061179
§ 371 (c)(1),
(2), (4) Date: Aug. 16, 2010

(87) PCT Pub. No.: WO2009/049950
PCT Pub. Date: Apr. 23, 2009

(65) Prior Publication Data
US 2010/0311346 A1   Dec. 9, 2010

Related U.S. Application Data

(60) Provisional application No. 60/980,209, filed on Oct. 16, 2007.

(30) Foreign Application Priority Data

Oct. 15, 2007  (EP) .................................... 07118434

(51) Int. Cl.
*H04B 1/10*  (2006.01)
*H04L 27/26*  (2006.01)

(52) U.S. Cl.
CPC .......... *H04B 1/1081* (2013.01); *H04L 27/2655* (2013.01)
USPC ....................................................... 375/346

(58) Field of Classification Search
CPC ..... H04L 27/2655; H04B 1/1081; H04B 1/10
USPC ................................................. 375/316, 346
See application file for complete search history.

(56) References Cited

U.S. PATENT DOCUMENTS 5,881,102 A * 3/1999 Samson ......................... 375/222
7,245,893 B1 * 7/2007 Husted et al. ............... 455/226.3
(Continued)

FOREIGN PATENT DOCUMENTS

| JP | 2001-358635 A | 12/2001 |
| JP | 2003-347968 A | 12/2003 |

(Continued)

OTHER PUBLICATIONS

3rd Generation Partnership Project. "Outcome of Cell Search Drafting Session." TSG-RAN WG1 #46bis, R1-062990, Seoul, Korea, Oct. 9-13, 2006.

*Primary Examiner* — Kevin M Burd
(74) *Attorney, Agent, or Firm* — Coats and Bennett, P.L.L.C.

(57) ABSTRACT

Methods and devices for detecting a symbol in a radio channel and for cell identification are disclosed. A signal is received from the radio channel and the signal is filtered by a filter being responsive to the symbol thereby establishing a first signal. A second signal dependent on the noise floor of the received signal is established—whereby a time interval expected to include multi-path components being excluded or suppressed. A third signal being the ratio between the first signal and the noise floor is established, and the presence of the symbol is detected by detecting a peak in the third signal.

34 Claims, 8 Drawing Sheets

(56) References Cited

U.S. PATENT DOCUMENTS

| | | | |
|---|---|---|---|
| 2003/0117979 A1 | 6/2003 | Chitrapu | |
| 2004/0246998 A1* | 12/2004 | Ma et al. | 370/527 |
| 2005/0047537 A1* | 3/2005 | Cheng | 375/355 |
| 2006/0008035 A1* | 1/2006 | Larsson | 375/343 |
| 2007/0025429 A1 | 2/2007 | Hahm et al. | |
| 2008/0043702 A1* | 2/2008 | Moon et al. | 370/342 |
| 2009/0323766 A1* | 12/2009 | Wang et al. | 375/130 |
| 2010/0118744 A1* | 5/2010 | Kwon et al. | 370/278 |

FOREIGN PATENT DOCUMENTS

| | | |
|---|---|---|
| JP | 2006-512840 A | 4/2006 |
| WO | 0213548 A2 | 2/2002 |
| WO | 2004059865 A1 | 7/2004 |
| WO | 2004073321 A2 | 8/2004 |
| WO | 2004114539 A1 | 12/2004 |
| WO | 2006014342 A2 | 2/2006 |
| WO | WO 2007111540 A1 * | 10/2007 |

* cited by examiner

COMMUNICATION DEVICE AND METHOD

TECHNICAL FIELD

The present invention relates to methods for detecting a symbol and methods of identifying a cell. The present invention also relates to communication devices being able to detect a symbol and to identify a cell.

BACKGROUND

In the forthcoming evolution of the mobile cellular standards like GSM and WCDMA, new transmission techniques like OFDM is likely to occur. Furthermore, in order to have a smooth migration from existing cellular systems to the new high capacity high data rate system in existing radio spectrum, the new system has to be able to operate in a flexible bandwidth and also in frequency division duplex (FDD) and time division duplex (TDD) mode. A proposal for such a new flexible cellular system is 3G Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Furthermore, data rates up to and above 100 Mb/s will be supported for the largest bandwidth. However, not only high rate services are expected to use 3G LTE, but also low rate services like voice. Since 3G LTE is designed for packet data (TCP/IP), VoIP (Voice over Internet Protocol) will be the service carrying speech.

One important aspect of LTE and similar systems is the mobility function, hence synchronization symbols and cell search procedures is of major importance in order for User Equipment (UE), such as a cellular phone, to detect and synchronize with adjacent cells.

A known method for detecting a symbol in a radio channel comprises the steps of match filtering a received signal using the symbol and determining the peaks in the filtered signal.

The method is used in a known method to identify a cell by user equipment. In this case the user equipment is receiving a signal from a synchronization channel. The received signal is match filtered using the synchronization symbol and peaks and corresponding timing of the filtered signal are determined. The timing information determined from the matched filter is used for later cell search stages, i.e. stages that determine frame timing and cell identity.

Whilst the known method for detecting a symbol in a radio channel and method to identify a cell, and corresponding devices, functions adequately, at least in some operational scenarios, they do have a number of disadvantages.

For example, in a time division duplex scenario where two user equipments are situated physically close to each other and one of them is communicating with a base station and the other is doing initial cell search (in the first place trying to identify a synchronization symbol). The latter user equipment will not be aware of the timing and, when the first user equipment is transmitting, the interference from the first user equipment received in the latter user equipment's receiver is much larger than the down link signal from the base station.

A drawback of the known method (and corresponding device) is that this will have the effect of an erroneous symbol matching and timing detection. Standard matched filtering techniques for symbol detection such as detection of synchronization symbols, in certain operational scenarios will give risk for very bad detection performance. This will increase the initial synchronization time considerably and, in the case of cell identification, calls risk to be lost during hand-over due to slow identification of cells by user equipment performing initial cell search and which need to hand-over to a new cell.

It is an object of the present invention to provide a method for detecting a symbol and method to identify a cell, and corresponding devices, which overcome or alleviate the abovementioned drawbacks to some extent.

SUMMARY

According to an aspect of the present invention, there is provided a method for detecting a symbol in which a signal is read from a radio channel and the received signal is filtered (e.g. match filtered) using the symbol. The noise floor of the received signal is established whereby a time interval expected to include multi-path components is excluded or suppressed. The symbol detection is done on the ratio between the matched filter output and a noise floor estimate.

According to another aspect of the present invention, there is provided a method to identify a cell in which a signal is read from a synchronization channel and the received signal is filtered (e.g. match filtered) using the synchronization symbol. The noise floor of the received signal is established whereby a time interval expected to include multi-path components is excluded or suppressed. The symbol detection is done on the ratio between the matched filter output and a noise floor estimate. Frame timing and cell group are determined from a received signal and this information is then used to identify the cell.

According to another aspect of the present invention, there is provided a communication device being able to detect a symbol in accordance with the method for detecting a symbol and a communication device being able to identify a cell in accordance with the method to identify a cell.

An advantage, in respect of some embodiments, is that the detector is very robust against interference scenarios, especially which may occur in time division duplex systems.

A further advantage, in respect of some embodiments, of the present invention is that synchronization times for the time division duplex case are improved and synchronization times similar to the frequency division duplex case can be achieved. This in turn have the advantage that communication devices based on the present invention will quicker identify cells to which it may connect, which in turn reduces the occasions of dropped calls and also improves the start-up connection times for the devices.

A yet further advantage, in respect of some embodiments, of the present invention is that it enables devices to use the same steps for cell identification independently whether operational in time division duplex or frequency division duplex mode.

DETAILED DESCRIPTION

Embodiments of the present invention are described below, by way of example only. It should be noted that details illustrated in the figures may not be drawn to scale. On the contrary, the dimensions of the details of the illustrations are chosen so as to improve the understanding of the present invention.

The description below is based on P-SCH detection in the 3GPP LTE system, TDD mode, but the invention could also be implemented and used in other OFDM based cellular systems (e.g. Wimax).

The current proposed cell search scheme for LTE is as follows (reference is made to 3GPP (ETSI) document R1-062990):
1. Detect new cell 5 ms timing using the Primary Synchronization Channel (P-SCH)
2. Detect frame timing and cell group using the Secondary Synchronization Channel (S-SCH)
3. Use the reference symbols for detecting the cell Identification (Cell ID)
4. Read Broadcast Channel (BCH) to receive cell specific system information It would be an advantage if the cell search, with respect to synchronization channel (SCH) symbols and information obtained in each step, could be the same in both Frequency Division Duplex (FDD) as well as in Time Division Duplex (TDD) operation.

However, since the interference scenario is different in FDD and TDD, known P-SCH detection techniques have some shortcomings in TDD.

Figure 1:
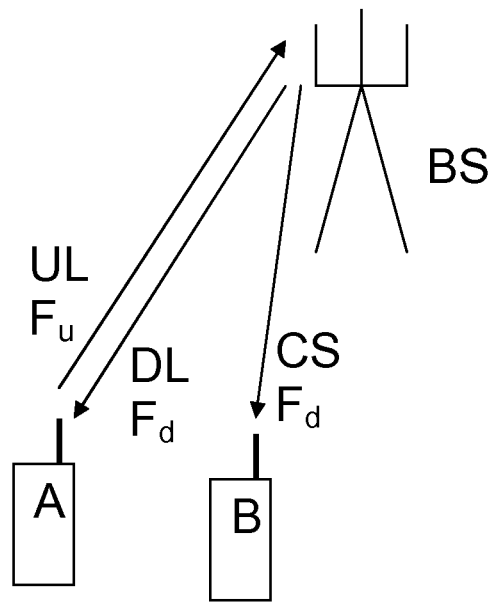
FIG. 1 illustrates an FDD scenario with two User Equipments.
Figure 2:
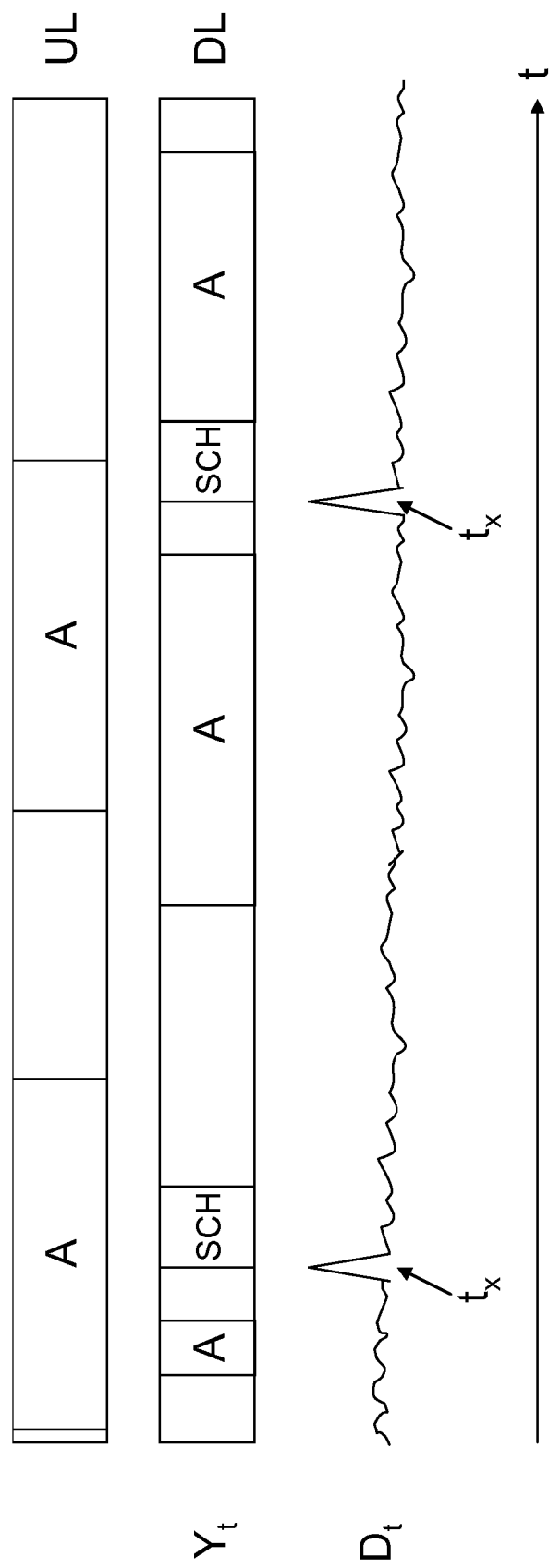
FIG. 2 shows a time diagram illustrating an FDD scenario.

In FDD the up-link and down-link uses different carrier frequencies. FIG. 1 illustrates an FDD scenario with two User Equipments, A and B, situated physically close to each other and A is communicating with a Base Station, BS. FIG. 2 shows a time diagram illustrating the FDD scenario. At some certain time instants, the User Equipment A received information on the Down-Link (DL) (carrier $F_d$) and transmit information on the Up-Link (UL) (carrier $F_u$). In FIG. 2 this is illustrated by the time blocks in DL and UL marked with "A". The User Equipment B is searching for a cell to possibly connect to, i.e. doing initial cell search. The User Equipment B starts to search for the P-SCH, transmitted at regular intervals. The transmitted P-SCH is illustrated in FIG. 1 by CS and in FIG. 2 by the time blocks in DL marked "SCH". For FDD LTE in particular, the P-SCH is transmitted every 5 ms. The search for P-SCH is typically carried out by doing match filtering to the P-SCH sequence. Mathematically, if $y_t$ represents the received DL, $s_t$ is the P-SCH sequence of length N the output from the P-SCH detection is done according to equations 1:

$$D_t = \left\| \sum_{k=0}^{N-1} s_k^* y_{t-k} \right\|^2 \quad \text{(equation: 1)}$$

$$\text{timing(peak)} = \arg\max_t D_t \quad \text{(equation: 2)}$$

The peaks in the matched filtering, timing(peak), indicated by $t_x$ in FIG. 2, are obtained at time instants corresponding to the time instants where the P-SCH is transmitted and hence (for LTE: 5 ms) timing is found as the time instant where maximum of the output from the matched filter is detected (according to equation 2). Frame timing (for LTE: 10 ms) and other system information is obtained in later cell search stages.

Figure 3:
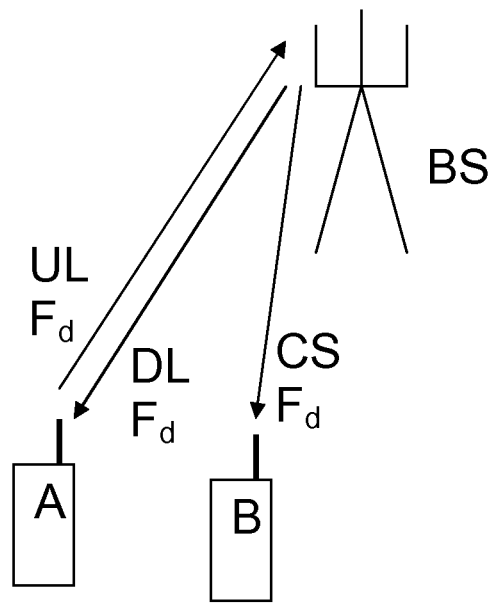
FIG. 3 illustrates a TDD scenario with two User Equipments.
Figure 4:
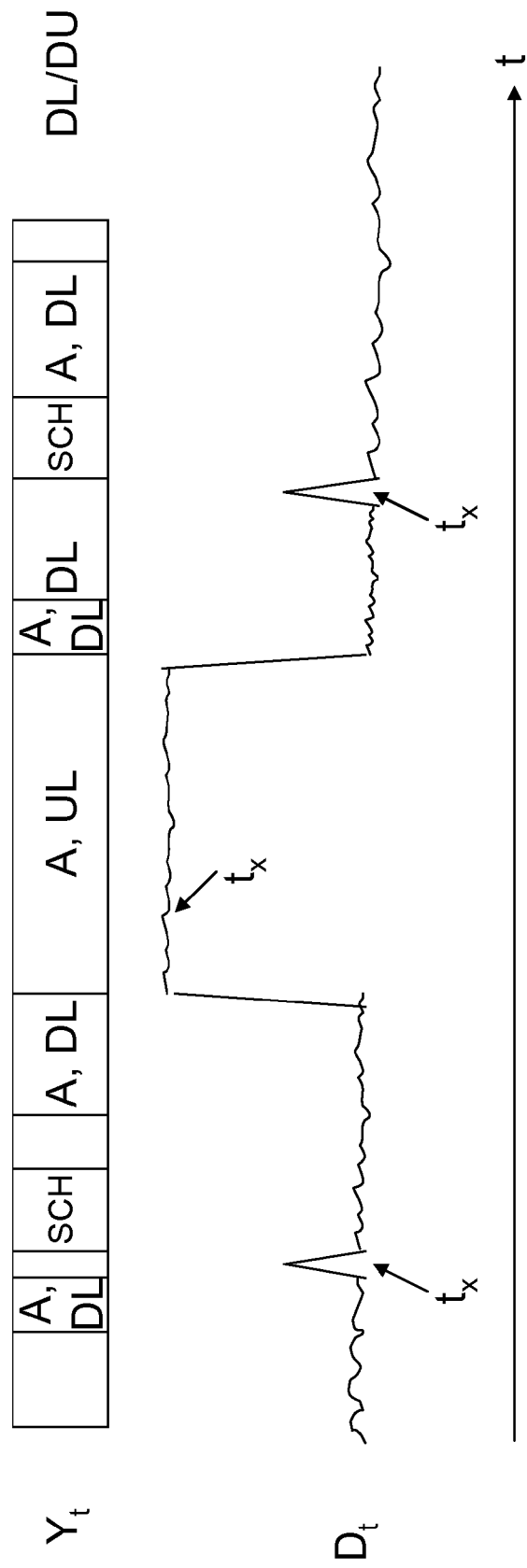
FIG. 4 shows a time diagram illustrating a TDD scenario.

A similar TDD scenario is illustrated in FIG. 3. A corresponding time diagram is shown in FIG. 4. In this case, the User Equipment A transmits at regular intervals (intervals, where UL transmission is permitted) on the same carrier as the DL ($F_d$). In FIG. 4, transmission by User Equipment A is illustrated by the time blocks in DL/UL marked with "A, UL" and transmission by the Base Station to User Equipment A is illustrated by time blocks in DL/UL marked with "A, DL". The transmitted P-SCH is illustrated in FIG. 3 by CS and in FIG. 4 by the time blocks in DL/DU marked "SCH". Now, since the distance between User Equipment A and User Equipment B is much smaller than the distance between B and the Base Station, BS, the UL interference from User Equipment A received in the User Equipment B's receiver (which at this stage—when doing initial cell search does not know UL and DL timing) is much larger than the DL signal. This will give the effect of a noise floor much higher than the P-SCH correlation peak, and hence erroneous timing detection is achieved (illustrated in FIG. 4 by $t_x$ during the transmission by User Equipment A).

Consequently, standard matched filtering techniques for P-SCH detection in TDD system will give risk for very bad detection performance increasing the initial synchronization time considerably. Hence, there is a need for P-SCH detection techniques robust to such interference scenarios.

According to the present invention, the P-SCH detection is done on the ratio between the matched filter output and a noise floor estimate whereby a time interval expected to include multi-path components is excluded or suppressed. Using this technique, the max peak is defined as a peak that is much larger than neighbouring samples, which makes the detector more robust for the TDD scenario described above. The determined P-SCH detector does not need any tuning of thresholds and is very robust against interference scenarios that can occur in TDD systems. The P-SCH detection works well even if the (UL) interference level is 35-40 dB larger than the DL interference.

Figure 5:
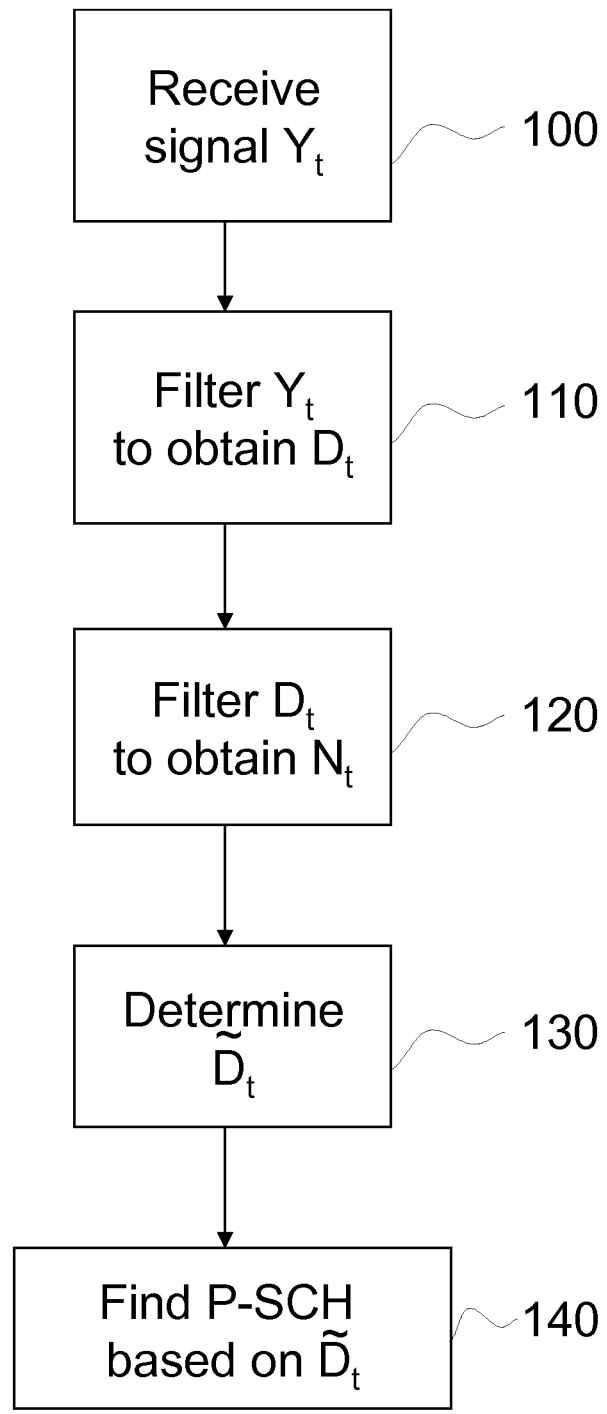
FIG. 5 shows a flow chart illustrating an embodiment of the present invention.

A flow chart of an embodiment of the invention is shown in FIG. 5. The User Equipment receives the signal $Y_t$ (100) and do matched filtering to obtain $D_t$(110). The noise floor at time t, $N_t$, is estimated as the average over a certain number of symbols of the output from the matched filter, with the exception of some samples close to the time instant t (120). The reason for excluding some samples is to exclude possible multi-path components of the signal and thereby essentially only measuring noise and not multi-path components. The detection is thereby made very robust against interference scenarios, especially which may occur in time division duplex systems. Mathematically, that can be written according to equation 3:

$$N_t = \frac{1}{m_1} \sum_{k=n}^{n+m_1} D_{t-k} + \frac{1}{m_2} \sum_{k=n}^{n+m_2} D_{t+k} \quad \text{(equation: 3)}$$

$$\tilde{D}_t = \frac{D_t}{N_t} \quad \text{(equation: 4)}$$

$$\text{timing(peak)} = \arg\max_t \tilde{D}_t \quad \text{(equation: 5)}$$

Where $m_1$, $m_2$ is the (noise) samples used to estimate the noise floor over and 2n, corresponding the number of samples that could be expected to include multi-path components. The value on n could typically be chosen as n=$N_{cp}$, i.e. as the number corresponding to the time of the Cyclic Prefix (CP). In an OFDM symbol, the cyclic prefix is a repeat of the end of the symbol at the beginning in order to allow multi-path to settle before the data arrives at the receiver. Typically the system uses a CP that is in time longer than the longest expected delay spread of the radio channel, and since—at this stage—the User Equipment does not know where the peak is within the CP, twice the CP samples is excluded to be sure not to include the multi-path components in the noise floor estimate. The length of $m_1$ should be chosen such that, for correct P-SCH timing, the noise floor estimate should be done over samples belonging to the DL transmission. In LTE, the SCH is transmitted in the middle of one 1 ms DL subframe, hence $m_1$ could be chosen as the number of samples corresponding to approximately 0.5 ms. Then, the new decision variable $\tilde{D}_t$ is obtained (130) according to equation 4 and the peaks of $\tilde{D}_t$, timing(peak), are determined according to equation 5 whereby the (5 ms) timing is found (140).

Figure 6:
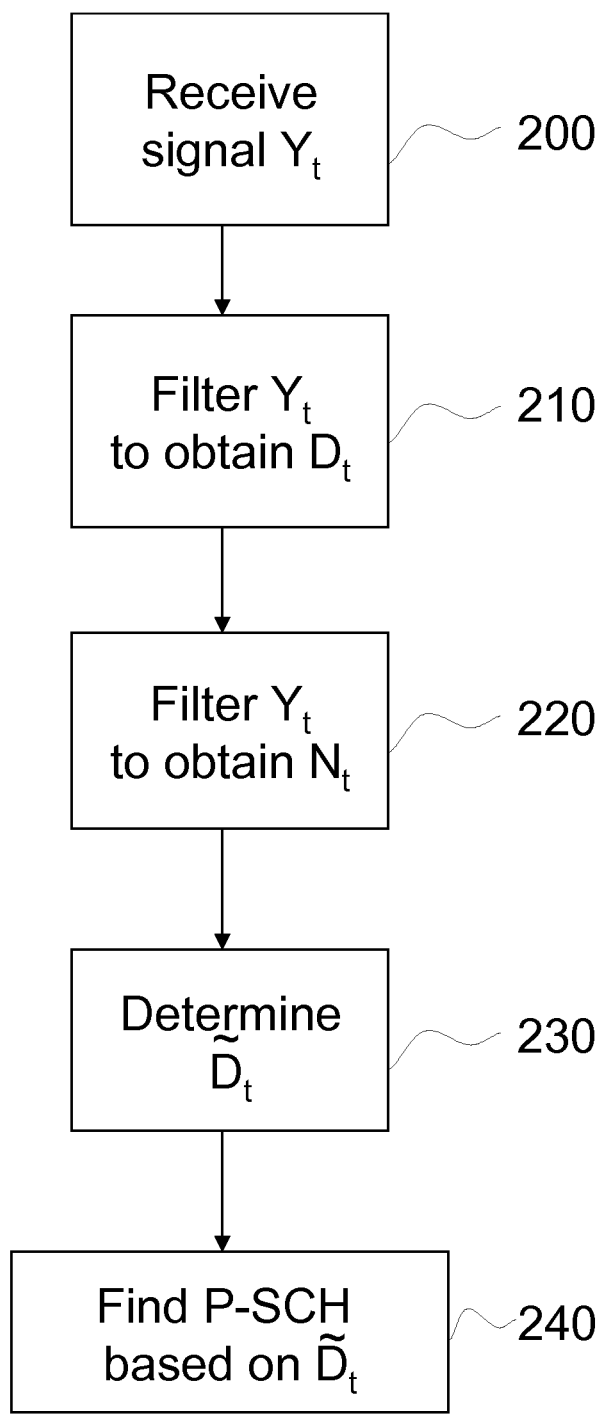
FIG. 6 shows a flow chart illustrating an embodiment of the present invention.

In an alternative embodiment of the invention, illustrated in FIG. 6, the User Equipment receives the signal $Y_t$ (200) and do matched filtering to obtain $D_t$ (210). Next, the noise floor at time t, $N_t$, is estimated from the received signal $Y_t$ (compared to from the output from the matched filter of the previous embodiment). For example, the noise floor at time t may be estimated by averaging the square of $|Y_t|$ over a number of samples. Samples close to the time instant t are excluded corresponding to the number of samples that could be expected to include multi-path components. Then, the new decision variable $\tilde{D}_t$ is obtained (230) according to equation 4 and the peaks of $\tilde{D}_t$, timing(peak), are determined according to equation 5 whereby the (5 ms) timing is found (140).

Referring to the embodiments disclosed above, when estimating the noise floor, $N_t$, it should be understood that in alternative embodiments any number of samples may be chosen to be excluded. Furthermore, by excluding the sample(s) is meant not only entirely omitting sample(s) but also other ways (e.g. other ways of suppressing the (noise-)signal or replacing it by pseudo-noise) to achieve the result of making the estimated noise signal independent or less dependent on multi-path components.

Figure 7:
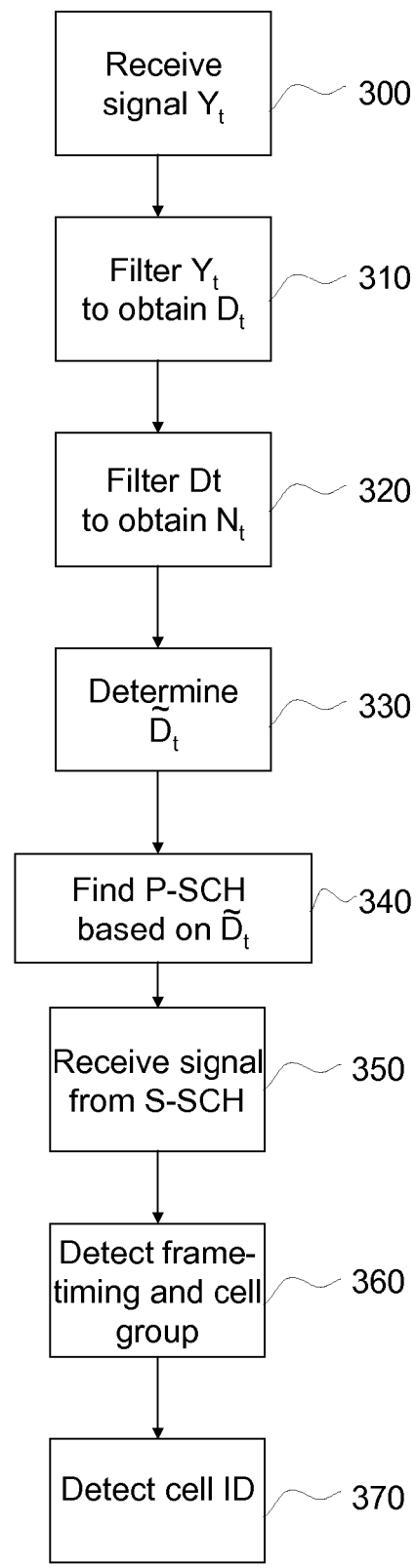
FIG. 7 shows a flow chart illustrating an embodiment of the present invention.

FIG. 7 shows a flow chart illustrating a method of identifying cell, cell ID, in a wireless communication system. The first five steps of the method correspond to the first five step of the method previously disclosed and discussed together with FIG. 5. Consequently, the User Equipment receives the signal $Y_t$ (300) and do matched filtering to obtain $D_t$ (310). Next, the noise floor at time t, $N_t$, is estimated as the average over a certain number of symbols of the output from the matched filter, with the exception of some samples close to the time instant t (320). Then, the new decision variable $\tilde{D}_t$ is obtained (330) according to equation 4 and the peaks of $\tilde{D}_t$, timing (peak), are determined according to equation 5 whereby the (5 ms) timing is found (340). Additionally, the User Equipment receives a signal from the secondary synchronization channel (350) and thereafter detects frame timing and cell group from the secondary synchronization channel (360). Finally, the Cell Identification is detected (370) for example by correlating with available cell ID codes.

In an alternative embodiment the first five steps of the method correspond to the first five step of the method previously disclosed and discussed together with FIG. 6 rather than FIG. 5, i.e. the noise floor at time t, $N_t$, is estimated from the received signal $Y_t$ (compared to from the output from the matched filter of the previous embodiment). A general equation corresponding to equation 3 is given by equation 6:

$$N_t = \frac{1}{m_1} \sum_{k=n}^{n+m_1} X_{t-k} + \frac{1}{m_2} \sum_{k=n}^{n+m_2} X_{t+k} \quad \text{(equation: 6)}$$

where $X_t$ represents the input signal on which the noise floor estimate is based. In particular, in the examples disclosed above, $X_t$ is either equal to $D_t$ or $Y_t$.

Referring to the embodiments disclosed above, matched filtering could be replaced by any kind of filtering which is responsive to (i.e. which could distinguish or detect) the synchronization sequence or, more generally, the symbol to be detected.

Figure 8:
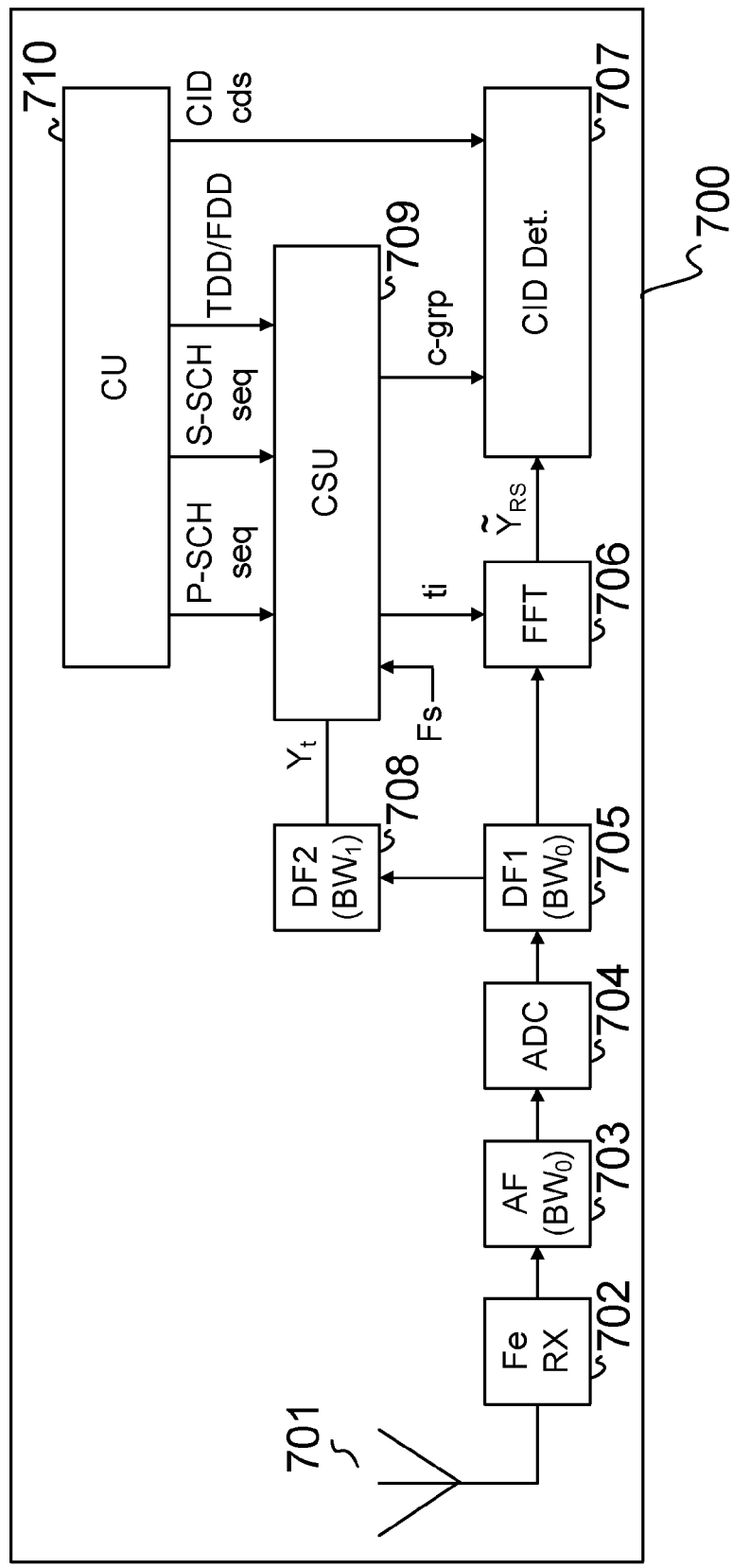
FIG. 8 shows a block diagram illustrating a user communication device according to an embodiment of the present invention.

FIG. 8 shows a block diagram of a User Equipment, 700. The User Equipment comprises an antenna, 701, connected to a front end receiver (FeRX), 702. The front end receiver is connected to an analogue filter (AF), 703 which in turn s connected to an analogue-to-digital converter (ADC), 704. The ADC is connected to a first digital filter (DF1), 705, which in turn is connected to a second digital filter (DF2), 708 and to a Fast Fourier Transformer (FFT), 706. The FFT is connected to a Cell Identification Detector (CID Det.), 707 and also to a Cell Search Unit (CSU), 709. The Cell Identification Detector and the Cell Search Unit are connected to a Control Unit (CU), 710. The Cell Search Unit is provided with a clock signal $F_s$. In an example, Fs=1.92 MHz.

In operation, in an LTE system and using the P-SCH detector as discussed above, the User Equipment will be doing initial cell search. From higher layer information (like frequency band used, history lists etc) the Cell Search Unit, 709, gets information whether it is FDD or TDD operation. This higher layer information is provided by the Control Unit, 710, as is illustrated by the connection "TDD/FDD" in FIG. 8.

In the case of FDD, the Cell Search Unit may carry out the cell search according to the cell search scheme currently proposed for LTE as discussed above. In this case, in operation, the second digital filter (DF2), 708, receives the signal $Y_t$ and do matched filtering by means of a P-SCH Matched Filter to obtain $D_t$. This is done in accordance with equation 1 and related explanation as described above. The relevant P-SCH sequence(s) is(are) provided to the Cell Search Unit, 709, by the Control Unit, 710, as is illustrated by "P-SCH seq" in FIG. 8. $D_t$ is fed to a detector. The peaks of $D_t$, timing(peak), are determined according to equation 2 by the detector, whereby the (5 ms) timing, (later referred to as td), is found.

In the case the Control Unit provides information to the Cell Search Unit that it is TDD operation, or in the case the Cell Search Unit does not distinguish between TDD and FDD operation, the User Equipment follows the following cell search scheme. A radio signal received by the antenna, 701, is fed to the front end receiver (Fe RX), 702, where it is downconverted to a baseband signal. The signal bandwidth is filtered out by the analogue filter, 703, (having a bandwidth of $BM_0$) and analogue-to-digital converted to a digital signal by the analogue-to-digital converter (ADC), 704. The signal is then digitally filtered by the first digital filter (DF1), 705, and fed to the FFT, 706. The signal out from the ADC, 704, is also fed to a second digital filter (DF2), 708, (having a bandwidth of $BW_1$) which filters out the synchronization channel bandwidth. A bandwidth $BW_1$ of 1.25 MHz is assumed to be used, i.e. the currently proposed LTE synchronization channel bandwidth). The filtered signal is fed to the Cell Search Unit (CSU), 709, that do the cell search P-SCH and S-SCH detection.

Figure 9:
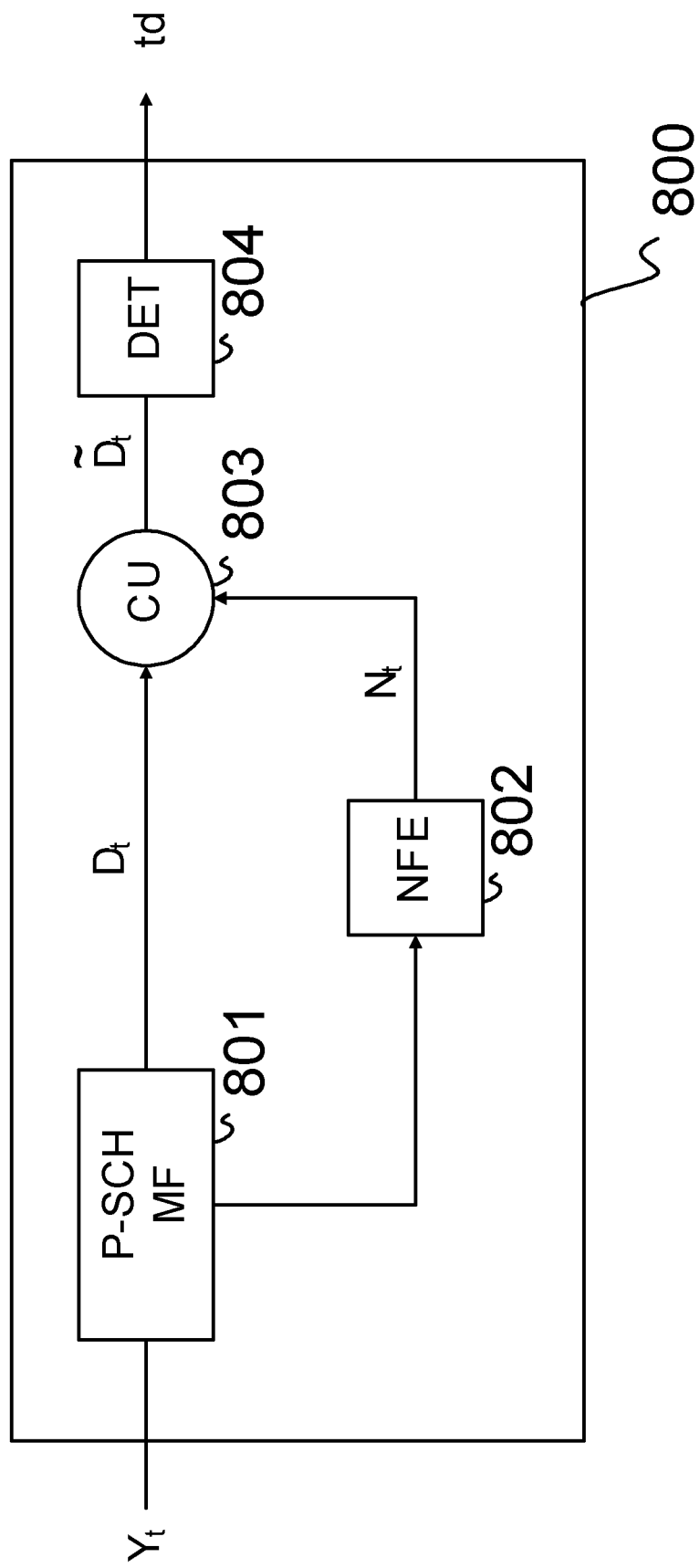
FIG. 9 shows a block diagram illustrating a first stage of a Cell Search Unit of the present invention.

Reference is now also be made to FIG. 9 which shows a block diagram of a first stage, 800, of the Cell Search Unit,

709. The first stage, 800, comprises a P-SCH Matched Filter (P-SCH MF), 801 which is connected to a Noise Floor Estimator (NFE), 802, and to a Calculating Unit (CU), 803. The Noise Floor Estimator, 802, is connected to the Calculating Unit, 803. The Calculating Unit 803 is connected to a Detector (DET), 804.

In operation, the second digital filter (DF2), 708, receives the signal $Y_t$ and do matched filtering by means of the P-SCH Matched Filter, 801, to obtain $D_t$. The relevant P-SCH sequence(s) is(are) provided to the Cell Search Unit, 709, by the Control Unit, 710, as is illustrated by "P-SCH seq" in FIG. 8. The noise floor at time t, $N_t$, is estimated, by means of the Noise Floor Estimator, 802, as the average over a certain number of symbols of the output from the matched filter, with the exception of some samples close to the time instant t (120). This is done in accordance with equation 3 and related explanation as described above. $D_t$, as provided by the P-SCH Matched Filter, 801, and $N_t$, as provided by the Noise Floor Estimator, 802, are fed to the Calculating Unit, 803. The Calculating Unit calculates the ratio in accordance with equation 4, thereby obtaining $\tilde{D}_t$, which in turn is fed to the Detector, 804. The peaks of $\tilde{D}_t$, timing(peak), are determined according to equation 5 by the Detector, 804, whereby the (5 ms) timing, td, is found.

The Cell Search Unit, 709, thereafter detects frame timing and cell group using the Secondary Synchronization Channel (S-SCH). The relevant S-SCH sequence(s) is(are) provided to the Cell Search Unit, 709, by the Control Unit, 710, as is illustrated by "S-SCH seq" in FIG. 8. The timing information, ti, is fed from the Cell Search Unit, 709, to the FFT, 706. The timing information, ti, is either identical to the timing, td, found by the Detector, 804, or a function thereof. The output of the FFT, $\tilde{Y}_{RS}$, (reference symbols) is fed to the Cell Identification Detector, 707. The Cell Identification Detector, 707, detects the Cell ID based on the received reference symbols, $\tilde{Y}_{RS}$, and Cell group information, illustrated as c-grp in FIG. 8, provided by the Cell Search Unit, 709, and Cell Identification Codes, illustrated as "CID cds" in FIG. 8, provided by the Control Unit, 710.

For example, when timing is determined, the cell group is detected by correlating all possible cell group signatures to the secondary synchronization signal S-SCH. Furthermore, the Cell ID within cell groups may be determined by correlating possible cell ID signatures on the reference OFDM pilot) symbols.

In an alternative embodiment of the invention, the Cell Search Unit, 709, does not distinguish whether it is FDD or TDD operation. In this case the same Cell Search scheme is provided for both FDD and TDD operation. In such alternative embodiment, this information may not need to be provided by the Control Unit to the Cell Search Unit (and the corresponding connection there between for this purpose may be omitted).

In a further alternative embodiment of the invention, instead of using the equation 7: (compare with equation 4 and related explanation as described above)

$$\tilde{D}_t = \frac{D_t}{N_t} \qquad \text{(equation: 7)}$$

to calculate the detector variable, $\tilde{D}_t$, equation 8 may be used:

$$\tilde{D}_t = \frac{f(D_t)}{N_t} \qquad \text{(equation: 8)}$$

where f(.) is a function. An example of such a function is a function summing $\tilde{D}_t$ over the length of the cyclic prefix $N_{cp}$. The output then corresponds to the sum of the powers over the multi-paths, which could improve the detection performance, by summing up all signal power.

It should be understood that "User Equipment" may for example be a cellular phone, a notebook enabled to connect to a wireless network or any kind of wireless device. In general terms, a User Equipment is referred to as a communication device.

The invention claimed is:

1. A method for detecting a symbol in a radio channel comprising the steps of:
   receiving a signal from the radio channel;
   filtering the received signal through a first filter being responsive to the symbol, thereby obtaining a first signal;
   establishing a noise floor estimate of the received signal by excluding or suppressing some samples of the received signal that are expected to include multi-path components and are close to a time instant for which the noise floor estimate is established;
   establishing a second signal being a representation of the ratio between the first signal and the noise floor estimate; and
   detecting the presence of the symbol by detecting a peak in the second signal.

2. The method of claim 1, wherein the step of establishing a noise floor estimate comprises basing the noise floor estimate on a digital representation of the received signal, and wherein the step of excluding or suppressing some samples close to the time instant for which the noise floor estimate is established comprises excluding or suppressing a number of samples essentially corresponding to twice the number of samples expected to include multi-path components.

3. The method of claim 1, wherein the step of establishing a noise floor estimate comprises basing the noise floor estimate on the first signal.

4. The method of claim 1, wherein the step of establishing a noise floor estimate comprises filtering a representation of the received signal through a second filter responsive to the power and/or amplitude of the signal.

5. The method of claim 1, wherein the noise floor estimate at a time instant t, $N_t$, is established according to the formula:

$$N_t = \frac{1}{m_1} \sum_{k=n}^{n+m_1} X_{t-k} + \frac{1}{m_2} \sum_{k=n}^{n+m_2} X_{t+k},$$

where $X_t$ is the signal on which the noise floor estimate is based, $m_1$, $m_2$ are the samples used to estimate the noise floor, and 2n are the samples expected to include multi-path components.

6. The method of claim 5, where n is set to the number of samples essentially corresponding to the time of the cyclic prefix ($N_{cp}$).

7. The method of claim 1, wherein the first signal at a time instant t, $D_t$, is established according to the formula:

$$D_t = \left\| \sum_{k=0}^{N-1} s_k^* y_{t-k} \right\|^2,$$

where $s^*_t$ is the symbol sequence of length N and $y_t$ represents the received signal.

8. The method of claim 1, further comprising the step of detecting the timing of the presence of the detected symbol.

9. The method of claim 8, wherein the timing of presence of the symbol, timing(peak), is established according to the formula:

$$\text{timing(peak)} = \arg\max_t \tilde{D}_t,$$

where $\tilde{D}_t$ represents the second signal.

10. The method of claim 1, further comprising the steps of:
determining if the radio channel is operating in frequency division duplex, and, if so, detecting the symbol by the steps of: filtering the received signal through the first filter thereby obtaining a third signal, and detecting the presence of the symbol by detecting a peak in the third signal.

11. The method of claim 1, wherein the symbol is a synchronization symbol and the signal received from the channel is received from a primary synchronization channel, and further comprising the steps of:
detecting the presence and timing of the symbol by detecting a peak in the second signal;
receiving a secondary synchronization signal from a secondary synchronization channel thereby obtaining a second received signal;
detecting frame timing and cell group from the second received signal; and
detecting the cell ID by correlating with available cell ID codes.

12. The method of claim 11, wherein the step of detecting frame timing and cell group from the second received signal comprises the step of retrieving the frame timing and cell group by utilizing the timing of the symbol detected by a peak in the second signal.

13. The method of claim 11, wherein the step of establishing a noise floor estimate comprises basing the estimate on a digital representation of the received signal, and wherein the step of excluding or suppressing some samples close to the time instant for which the noise floor estimate is established comprises excluding or suppressing a number of samples essentially corresponding to twice the number of samples expected to include multi-path components.

14. The method of claim 11, wherein the step of establishing a noise floor estimate comprises basing the estimate on the first signal.

15. The method of claim 11, wherein the step of establishing a noise floor estimate comprises filtering a representation of the received signal through a second filter responsive to the power and/or amplitude of the signal.

16. The method of claim 11, wherein the noise floor estimate at a time instant t, $N_t$, is established according to the formula:

$$N_t = \frac{1}{m_1}\sum_{k=n}^{n+m_1} X_{t-k} + \frac{1}{m_2}\sum_{k=n}^{n+m_2} X_{t+k},$$

where $X_t$ is the signal on which the noise floor estimate is based, $m_1$, $m_2$ are the samples used to estimate the noise floor, and 2n are the samples expected to include multi-path components.

17. The method of claim 16, where n is set to the number of samples essentially corresponding to the time of the cyclic prefix ($N_{cp}$).

18. The method of claim 11, wherein the first signal at a time instant t, $D_t$, is established according to the formula:

$$D_t = \left\|\sum_{k=0}^{N-1} s^*_k y_{t-k}\right\|^2,$$

where $s^*_t$ is the symbol sequence of length N and $y_t$ represents the received signal.

19. The method of claim 11, further comprising the step of detecting the timing of the presence of the detected symbol.

20. The method of claim 19, wherein the timing of the presence of the detected symbol, timing(peak), is established according to the formula:

$$\text{timing(peak)} = \arg\max_t \tilde{D}_t,$$

where $\tilde{D}_t$ represents the second signal.

21. The method of claim 11, further comprising the steps of:
determining if the radio channel is operating in frequency division duplex, and, if so, detecting the cell ID by the steps of:
filtering the first received signal through the first filter, being responsive to a synchronization symbol, thereby obtaining a fourth signal;
detecting the presence and timing of the symbol by detecting a peak in the fourth signal;
receiving a signal from a secondary synchronization channel thereby obtaining a second received signal;
detecting frame timing and cell group from the second received signal; and
detecting the cell ID by correlating with available cell ID codes.

22. The method of claim 21, wherein the step of detecting frame timing and cell group from the second received signal comprises the step of retrieving the frame timing and cell group by utilizing the timing of the symbol detected by a peak in the fourth signal.

23. A communication device configured to detect a symbol of a radio channel, the communication device comprising:
a receiver for receiving a signal from the radio channel;
a first filter connected to the receiver, the first filter being responsive to the symbol;
a noise floor estimator connected to the receiver or the first filter, the noise floor estimator configured to provide a signal dependent on a noise floor of the received signal determined by excluding or suppressing some samples of the received signal that are expected to include multi-path components and are close to a time instant for which the noise floor estimate is established;
a calculating unit connected to the first filter and the noise floor estimator, the calculating unit configured to calculate the ratio between the signals from the first filter and the noise floor estimator; and
a detector connected to the calculating unit configured to detect a peak in the signal from the calculating unit.

24. The communication device of claim 23, wherein the noise floor estimator is configured to exclude or suppress a number of samples essentially corresponding to twice the number of samples expected to include multi-path components.

25. The communication device of claim 23, wherein the noise floor estimator comprises a second filter responsive to the power and/or amplitude of the signal.

26. The communication device of claim 23, wherein the noise floor estimator is configured to calculate the noise floor estimate at a time instant t, $N_t$, according to the formula:

$$N_t = \frac{1}{m_1}\sum_{k=n}^{n+m_1} X_{t-k} + \frac{1}{m_2}\sum_{k=n}^{n+m_2} X_{t+k},$$

where $X_t$ is the signal on which the noise floor estimate is based, $m_1$, $m_2$ are the samples used to estimate the noise floor, and 2n are the samples expected to include multi-path components.

27. The communication device of claim 26, where n is set to the number of samples essentially corresponding to the time of the cyclic prefix ($N_{cp}$).

28. The communication device of claim 23, wherein the first filter is configured to calculate a signal at a time instant t, $D_t$, according to the formula:

$$D_t = \left\|\sum_{k=0}^{N-1} s_k^* y_{t-k}\right\|^2,$$

where $s^*_t$ is the symbol sequence of length N and $y_t$ represents the received signal.

29. The communication device of claim 23, further comprising a cell search unit configured to detect the timing of the presence of the detected symbol.

30. The communication device of claim 29, wherein the cell search unit is configured to calculate timing(peak) according to the formula:

$$\text{timing(peak)} = \arg\max_t \tilde{D}_t,$$

where $\tilde{D}_t$ represents the ratio between the signals from the first filter and the noise floor estimator.

31. The communication device of claim 29, further comprising a fast fourier transformer (FFT) wherein the FFT is connected to the cell search unit and is configured to be responsive to the timing of the presence of the detected symbol.

32. The communication device of claim 31, further comprising a control unit configured to determine if the radio channel is operating in frequency division duplex or time division duplex.

33. The communication device of claim 32, further comprising a code identification detector connected to the cell search unit, the FFT, and the control unit, the code identification detector configured to detect the cell ID by correlating with available cell ID codes.

34. The communication device of claim 23, wherein the communication device is a cellular phone.

* * * * *